(12) United States Patent
Yoon et al.

(10) Patent No.: US 11,050,828 B2
(45) Date of Patent: Jun. 29, 2021

(54) ELECTRONIC DEVICE, SERVER AND METHOD OF CONTROLLING THE SAME

(71) Applicant: SAMSUNG ELECTRONICS CO., LTD., Suwon-si (KR)

(72) Inventors: Seungil Yoon, Suwon-si (KR); Kwanyoung Kim, Suwon-si (KR); Dongwook Kim, Suwon-si (KR); Minsup Kim, Suwon-si (KR); Jaemyung Hur, Suwon-si (KR); Jungseop Kim, Suwon-si (KR); Hojune Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 75 days.

(21) Appl. No.: 16/426,883

(22) Filed: May 30, 2019

(65) Prior Publication Data

US 2020/0059522 A1 Feb. 20, 2020

(30) Foreign Application Priority Data

Aug. 14, 2018 (KR) .................. 10-2018-0095111

(51) Int. Cl.
*G10L 15/00* (2013.01)
*H04L 29/08* (2006.01)
(Continued)

(52) U.S. Cl.
CPC ............ *H04L 67/125* (2013.01); *G10L 15/22* (2013.01); *G10L 15/30* (2013.01); *H04B 10/1149* (2013.01); *G10L 2015/223* (2013.01)

(58) Field of Classification Search
CPC ......... G06F 3/167; G10L 15/22; G10L 15/30; G10L 2015/223; H04B 10/1149; H04L 67/125
(Continued)

(56) References Cited

U.S. PATENT DOCUMENTS

2012/0114336 A1* 5/2012 Kim ................ H04N 21/41415
398/106
2013/0290001 A1 10/2013 Yun et al.
(Continued)

FOREIGN PATENT DOCUMENTS

EP          2 472 894 A1    7/2012
KR   10-2010-0091863 A     8/2010
KR   10-2016-0038542 A     4/2016

OTHER PUBLICATIONS

International Search Report and Written Opinion (PCT/ISA/210 and PCT/ISA/237) dated Oct. 4, 2019 issued by International Searching Authority in International Application No. PCT/KR2019/007074.
(Continued)

*Primary Examiner* — Khai N. Nguyen
(74) *Attorney, Agent, or Firm* — Sughrue Mion, PLLC

(57) ABSTRACT

An electronic apparatus and method of controlling the electronic apparatus are provided. The electronic apparatus includes an operation performer, network communicator circuitry that performs network communication with a server, infrared communicator circuitry, and a processor that controls the operation performer to perform a predetermined operation, obtains information of an external device from a first infrared signal of the external device, is the first infrared signal being obtained through the infrared communicator circuitry, controls the network communicator circuitry to transmit the obtained information of the external device to the server to register the external device as a control target, obtains a control command for controlling the external device from the server, and controls the infrared communicator circuitry to transmit a second infrared signal, which contains command information based on the obtained con-
(Continued)

trol command, to the external device to make the external device perform an operation corresponding to the obtained control command.

20 Claims, 14 Drawing Sheets

(51) Int. Cl.
*H04B 10/114* (2013.01)
*G10L 15/30* (2013.01)
*G10L 15/22* (2006.01)

(58) Field of Classification Search
USPC .......................................................... 704/251
See application file for complete search history.

(56) References Cited

U.S. PATENT DOCUMENTS

| | | | |
|---|---|---|---|
| 2014/0250183 A1* | 9/2014 | Unagami | H04L 12/2809 709/204 |
| 2017/0366778 A1* | 12/2017 | Kim | H04N 21/42204 |
| 2018/0040239 A1* | 2/2018 | Hur | G08C 23/04 |
| 2018/0061223 A1* | 3/2018 | Shin | G05B 15/02 |
| 2018/0198638 A1* | 7/2018 | Ha | H04L 12/2818 |
| 2020/0059522 A1* | 2/2020 | Yoon | G06F 3/167 |
| 2020/0090499 A1* | 3/2020 | Kim | G08C 17/00 |

OTHER PUBLICATIONS

Communication dated May 11, 2021 issued by the European Patent Office in European Application No. 19850511.7.

* cited by examiner

ELECTRONIC DEVICE, SERVER AND METHOD OF CONTROLLING THE SAME

CROSS-REFERENCE TO RELATED THE APPLICATION

This application is based on and claims priority under 35 U.S.C. § 119 to Korean Patent Application No. 10-2018-0095111 filed on Aug. 14, 2018 in the Korean Intellectual Property Office, the disclosure of which is incorporated by reference herein in its entirety.

BACKGROUND

1. Field

The disclosure relates to an electronic apparatus, a server and a method of controlling the same, which enable remote or voice control for a legacy electronic device, for example, having no network communication functions.

2. Description of the Related Art

With recent development of network communication technology, an Internet-of-things (IoT) system has been developed to control many electronic apparatuses through a network. Up-to-date electronic apparatuses have a network communication function so as to be applied to the IoT system.

In a current living space, legacy electronic devices having no network communication functions coexist with up-to-date electronic devices having a network communication function. Further, even the up-to-date electronic apparatus supporting the network communication function may be set by a consumer to be used without the network communication function, i.e., by keeping its network connection turned off.

To control the legacy electronic device or the electronic device of which network connection is turned off, a user performs manual control or uses a remote controller. However, the manual control of the electronic device is very inconvenient for a user. Further, the control based on the remote controller requires a number of remote controllers as many as the number of electronic devices. In particular, the remote controller not used frequently is likely to be lost and a user has to look for the remote controller. Besides, the legacy electronic device having no network communication functions or the electronic device set to turn off the network connection is only controllable at a short distance within a range of vision, but not controllable at a long distance out of the range of vision.

SUMMARY

In accordance with an aspect of the disclosure, there is provided an electronic apparatus comprising an operation performer; network communicator circuitry configured to perform network communication with a server; infrared communicator circuitry; and a processor configured to control the operation performer to perform a predetermined operation, obtain information of an external device from a first infrared signal of the external device, the first infrared signal being obtained through the infrared communicator circuitry, control the network communicator circuitry to transmit the obtained information of the external device to the server to register the external device as a control target, obtain a control command for controlling the external device from the server, and control the infrared communicator circuitry to transmit a second infrared signal, which contains command information based on the obtained control command, to the external device to make the external device perform an operation corresponding to the obtained control command.

In accordance with another aspect of the disclosure, there is provided an electronic apparatus comprising an operation performer; infrared communicator circuitry; and a processor configured to control the operation performer to perform a predetermined operation, obtain information of an external device from a first infrared signal of the external device, the first infrared signal being obtained through the infrared communicator circuitry, register the external device as a control target based on the obtained information of the external device, and control the infrared communicator circuitry to transmit a second infrared signal which contains command information to make the external device perform an operation corresponding to a control command.

In accordance with another aspect of the disclosure, there is provided a server comprising network communicator circuitry configured to perform network communication with an electronic apparatus; and a processor configured to obtain information of an external device from the electronic apparatus through the network communicator circuitry, register the external device as a control target based on the obtained information of the external device, and control the network communicator circuitry to transmit a control command for controlling the external device to the electronic apparatus through the network communicator circuitry to make the electronic apparatus control the external device.

According to another aspect of the disclosure, there is provided a method of controlling an electronic apparatus, the method comprising obtaining a first infrared signal of an external device; obtaining information of the external device from the first infrared signal; transmitting the obtained information of the external device to a server to register the external device as a control target; obtaining a control command for the external device from the server; and transmitting a second infrared signal, which contains command information based on the control command, to the external device to make the external device perform an operation corresponding to the obtained control command.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Below, embodiments of the disclosure will be described in detail with reference to accompanying drawings. Description of embodiments will be made based on details illustrated in the accompanying drawings, in which like numerals or symbols refer to elements implementing substantially like functions. As used herein, the terms "1st" or "first" and "2nd" or "second" may use corresponding components regardless of importance or order and are used to distinguish one component from another without limiting the components.

Figure 1:
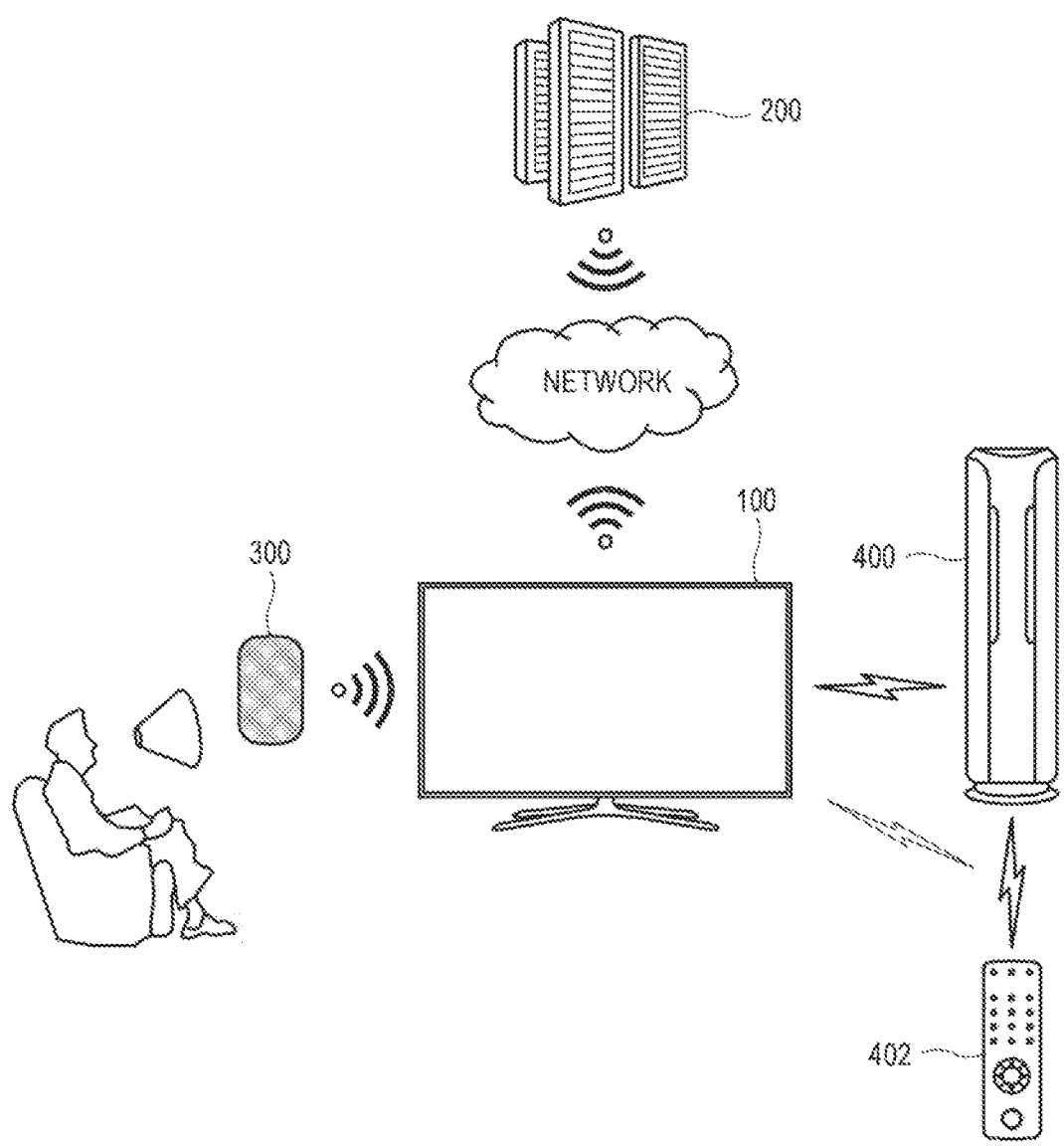
FIG. 1 is a schematic view of an electronic apparatus control system according to an embodiment.

FIG. 1 is a schematic view of an electronic apparatus control system 1 according to an embodiment. The electronic apparatus control system 1 includes an electronic apparatus 100 serving as a medium of control, a server 200, a control device 300, and an external device 400 serving as a control target. The electronic apparatus 100 may include various electronic apparatuses, for example, a TV, a computer, a notebook computer, a smart phone, a tablet computer, a mobile phone, a smart watch, a wearable device, a computer, a multimedia player, an electronic frame, a digital billboard, a large format display (LFD), a digital signage, a set-top box, etc. Likewise, the server 200 may include an Internet-of-things (IoT) cloud server, etc. Similarly, the control device 300 may include a mobile apparatus, for example, a notebook computer, a smart phone, a tablet computer, a mobile phone, a smart watch, a wearable device, a remote controller, etc. Equally, the external device 400 may include various external devices, which have no network communication functions or which have been set to turn off their own network connection, such as an air conditioner, an audio system, a refrigerator, a light, a door lock, a camera and the like controllable by an infrared (IR) signal. Here, the electronic apparatus 100 is connected to the server 200 through a network.

Figure 2:
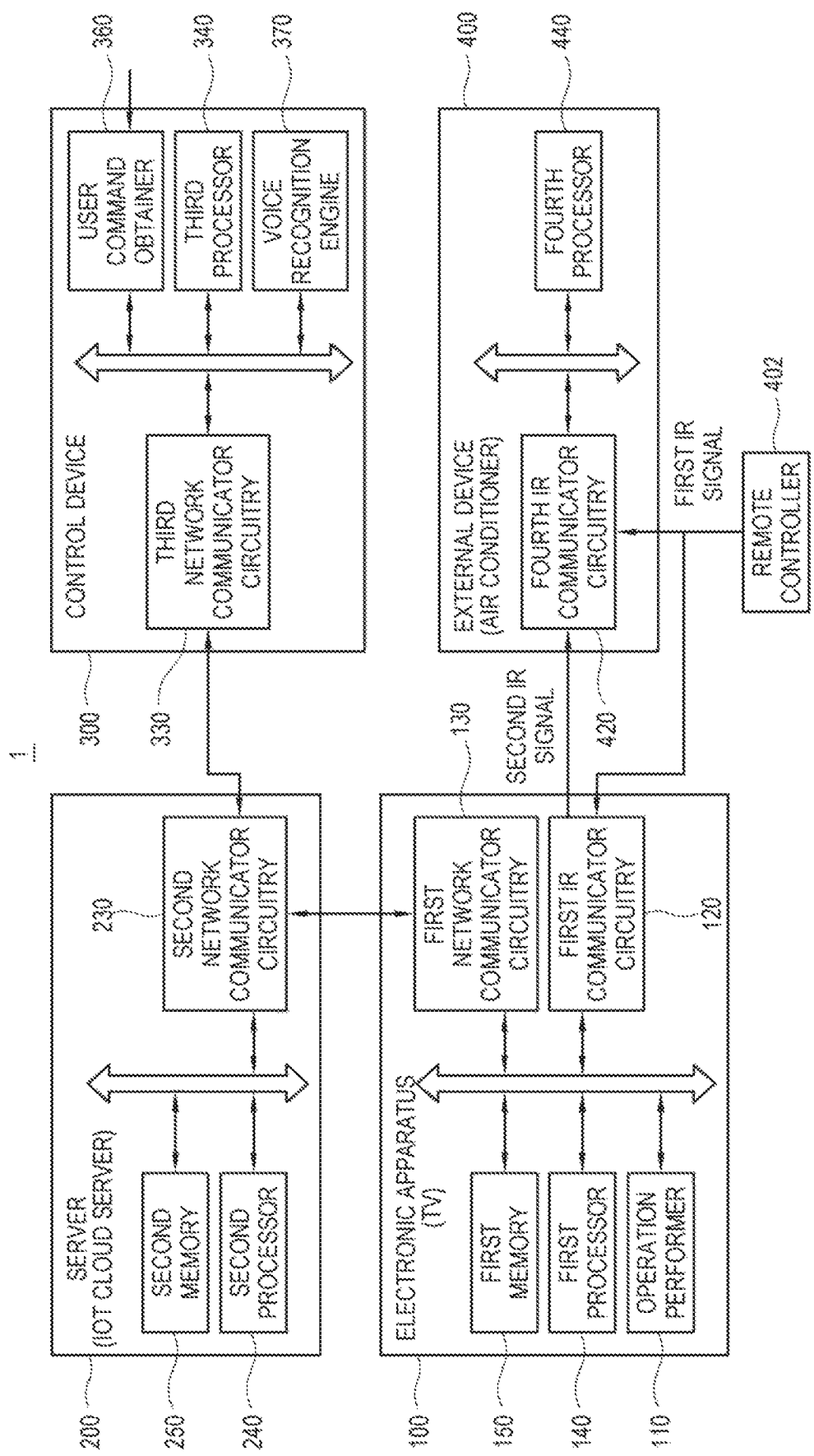
FIG. 2 is a block diagram of the electronic apparatus control system of FIG. 1, according to an embodiment.

FIG. 2 is a block diagram of the electronic apparatus control system of FIG. 1, according to an embodiment.

As shown therein, the electronic apparatus 100 includes an operation performer 110, a first IR communicator circuit 120, a first network communicator circuit 130, a first processor 140, a first memory 150, etc. The electronic apparatus 100 serves as a medium of control between the server 200 and the external device 400. In other words, the electronic apparatus 100 controls the external device 400 in response to a control command of the server 200.

The operation performer 110 may for example include a display, an image obtainer, an image processor, an audio processor, etc. to carry out substantial operations of the electronic apparatus 100.

The first IR communicator circuit 120 obtains an infrared signal from the remote controller (not shown) of the electronic apparatus 100 to control the operation performer 110. Further, the first IR communicator circuit intercepts a first IR signal emitted from a remote controller 402 of the external device 400, and emits a second IR signal including command information for controlling the external device 400.

The first network communicator circuit 130 performs network communication with the server 200. The first network communicator circuit 130 may transmit information about the external device 400, for example, a device profile to the server 200, or obtain a control command of the external device 400 from the server 200. The first network communicator circuit 130 may for example include a radio frequency (RF) circuit that transmits/obtains an RF signal to perform wireless communication with the server 200, and may be configured to perform one or more communications among Wi-Fi, Bluetooth, Zigbee, ultra-wide band (UWB), wireless universal serial bus (USB), and a near field communication (NFC). The first network communicator circuit 130 may perform wired communication with the server 200 and other apparatuses through a wired local area network (LAN). The first network communicator circuit 130 may be actualized by various communication ways other than a connecting portion including a connector or a terminal for wired connection.

The first processor 140 performs control to operate general elements of the electronic apparatus 100. The first processor 140 may load a control program (containing one or more instructions) from the first memory 150 described below to perform such control operations and may include at least one central processing unit (CPU) to execute the loaded control program.

The control program may include a program(s) actualized by at least one among a basic input/output system (BIOS), a device driver, an operating system, firmware, a platform, and an application. According to an embodiment, the application may be previously installed or stored when the electronic apparatus 100 is manufactured, or may be installed based on data of the application obtained from the outside in the future when necessary. The data of the application may for example be downloaded from an app server such as an application market to the electronic apparatus 100. Such an app server is given as an example of a computer program product of the disclosure, but not limited thereto.

The first processor 140 may for example analyze the first IR signal of the remote controller 402 of the external device 400, which is intercepted through the first IR communicator circuit, and obtain information about the external device 400 through the analysis of the first IR signal, for example, a manufacturer, a product type, and the like device profile. Here, the device profile may show the manufacturer and the product name of the external device 400, for example "an air conditioner of a brand A".

The first processor 140 identifies whether "the air conditioner of the brand A" has been registered as the control target (e.g. a virtual IoT device). When the electronic apparatus 100 is operating while "the air conditioner of the brand A" has not been registered as the control target, the first processor 140 asks a user through the operation performer 110, for example, the display, whether the user wants to register "the air conditioner of the brand A" as the control target. When the electronic apparatus 100 is not operating while "the air conditioner of the brand A" has not been registered as the control target, the first processor 140 operates the operation performer 110, e.g. the display, to ask a user whether the user wants to register "the air conditioner of the brand A" as the control target, or to keep a standby mode and display a control-target registration event for asking a user whether the user wants to register "the air conditioner of the brand A" as the control target when the user turns on the electronic apparatus 100. In this way, the first IR communicator circuit 120 always operates even when the electronic apparatus 100 is not operating, and intercepts a first IR signal emitted from the remote controller 402 of the surrounding external device 400. Typically, the first IR communicator circuit 120 may easily intercept the first IR signal emitted from the remote controller 402 of the surrounding external device 400 because the IR signal is reflected from a wall or an obstacle. In some situations, a user may make the remote controller 402 of the external device 400 emit the first IR signal directly toward the electronic apparatus 100, but this operation is not required for the first IR communicator circuit 120 to intercept the first IR signal.

The first processor 140 transmits the device profile to the server 200 through the first network communicator circuit 130 and requests the registration of the control target (e.g. the virtual IoT device) when a user selects the external device 400 to be registered as the control target. In this case, the first processor 140 may make the server 200 register the functions of the external device 400 as the functions of the electronic apparatus 100. In other words, the server 200 may do registration to identify that the electronic apparatus 100 performs various functions of "the air conditioner of the brand A". Meanwhile, the first processor 140 may make the server 200 register the electronic apparatus 100 as a medium for controlling "the air conditioner of the brand A". The first processor 140 controls the first IR communicator circuit 120 to generate the second IR signal for controlling the operations of the external device 400 based on a control command when obtaining the control command of the external device 400 through the server 200.

The first memory 150 is configured to store data without limitations. The first memory 150 is accessed by the first processor 140, and allows the first processor 140 to read, load, write, modify, delete, update, etc. the data. The data stored in the first memory 150 may for example include collected device profile data of the control target, infrared code data of products according to manufacturers, control target registration data, etc. The first memory 150 includes an operating system, various applications executable on the operating system, image data, appended data, etc. The first memory 150 includes a program (application) that performs a code analysis of the first IR signal, conversion into the second IR signal corresponding to the control command, etc.

The first memory 150 includes a nonvolatile memory in which the control program is stored, and a volatile memory to which at least a part of the stored control program is loaded.

The first memory 150 may include a storage of at least one type among a flash memory type, a hard disk type, a multimedia card micro type, a card type memory (for example, secure digital (SD), extreme digital (XD), etc.), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc, etc.

The server 200 includes a second network communicator circuit 230, a second processor 240, a second memory 250, etc.

The second network communicator circuit 230 performs network communication with the electronic apparatus 100 and the control device 300. The second network communicator circuit 230 obtains the device profile of the external device 400 from the electronic apparatus 100, and the control command of the external device 400 from the control device 300. The second network communicator circuit 230 may also transmit the control command of the external device 400, obtained from the control device 300, to the electronic apparatus 100.

The second network communicator circuit 230 may for example include a radio frequency (RF) circuit to transmit/obtain an RF signal for performing wireless communication with the electronic apparatus 100 and/or the control device 300, and be configured to perform one or more communications among Wi-Fi, Bluetooth, Zigbee, UWB), wireless USB, and NFC. The second network communicator circuit 230 may perform wired communication with the electronic apparatus 100, the control device 300 and other devices through the wired LAN. Besides the connecting portion including the connector or terminal for the wired connection, the second network communicator circuit 230 may be actualized by various communication ways.

The second processor 240 performs control to operate general elements of the server 200. The second processor 240 may load a control program (containing one or more instructions) to perform such control operations and may include at least one CPU to execute the loaded control program.

The second processor 240 may generally control a plurality of registered control targets, e.g. a plurality of registered IoT devices, based on an obtained control command.

The second processor 240 may also identify whether the external device 400, for example "the air conditioner of the brand A" has been registered as the control target (e.g. a virtual IoT device), based on the device profile obtained from the electronic apparatus 100. In some embodiments, the second processor 240 may separately identify whether the control targets have been registered, although the second processor 240 may use the registration results identified by the electronic apparatus 100. When "the air conditioner of the brand A" has not been registered as the control target, "the air conditioner of the brand A" is registered as the control target. In this case, the second processor 240 may register the functions of the external device 400 as the additional functions of the electronic apparatus 100. In other words, the server 200 may make the electronic apparatus 100 be registered to perform various functions of "the air conditioner of the brand A". In this case, when obtaining a control command of "set the temperature level of the air conditioner higher", the second processor 240 identifies the control command as the function of the electronic apparatus 100 and transmits the control command to the electronic apparatus 100.

Meanwhile, the second processor 240 may register the electronic apparatus 100 as an intermediate medium for controlling "the air conditioner of the brand A". In this case, the second processor 240 distinguishes "the air conditioner of the brand A" from the existing IoT devices and registers "the air conditioner of the brand A" as a virtual IoT device to be matched with the electronic apparatus 100 capable of applying IR-control to "the air conditioner of the brand A". In other words, the second processor 240 distinguishes "the air conditioner of the brand A" as, for example, an air conditioner without network communication capability as compared with existing IoT devices which do have network communication capability. In this case, when obtaining a control command of "set the temperature level of the air conditioner higher through a TV", the second processor 240 transmits the control command to the electronic apparatus 100 so that the electronic apparatus 100 may serve as an intermediate medium.

When another air conditioner (e.g. an air conditioner of a brand B) is additionally registered as an IoT device to the server 200, the second processor 240 identifies the control command of "set the temperature level of the air conditioner higher" as a control command for the air conditioner (e.g. the air conditioner of the brand B) and transmits the control command to the air conditioner (e.g. the air conditioner of the brand B).

When another air conditioner has not been registered as the IoT device in the server 200, the second processor 240 analyzes the control command of "set the temperature level of the air conditioner higher" as a control command of "set the temperature level of the air conditioner higher through the TV" and transmits the control command to the electronic apparatus 100 by regarding the electronic apparatus 100 as an intermediate medium.

When obtaining the control command for "the air conditioner of the brand A" of the virtual IoT device, the second processor 240 transmits the control command to a matching electronic apparatus 100 because the second processor 240 cannot directly wirelessly control "the air conditioner of the brand A", thereby making "the air conditioner of the brand A" be subjected to IR control of the electronic apparatus 100. For example, when obtaining "the temperature level+ in the air conditioner of the brand A through the TV" from the control device 300, the second processor 240 transmits the control command of "the temperature level+ in the air conditioner of the brand A" to the TV.

The first processor 140 of the electronic apparatus 100 generates a second IR signal code based on "the temperature level+ in the air conditioner of the brand A" obtained from the server through the first network communicator circuit 130, and transmits the second IR signal code to the first IR communicator circuit 120. The first IR communicator circuit 120 emits a second IR signal corresponding to "the temperature level+ in the air conditioner" and controls the external device 400 (the air conditioner of the brand A).

The second memory 250 is configured to store data without limitations. The second memory 250 is accessed by the second processor 240, and allows the second processor 240 to read, load, write, modify, delete, update, etc. the data. The data stored in the second memory 250 may for example include device profile data of control targets, device profile data obtained from the electronic apparatus 100, electronic apparatus data being matched with virtually registered control targets (e.g. external devices), etc. The second memory 250 may include an operating system, various applications executable on the operating system, appended data, etc.

The second memory 250 includes a nonvolatile memory in which the control program is stored, and a volatile memory to which at least a part of the stored control program is loaded.

The control device 300 obtains a control command and substantially controls the external device 400 via the server 200 and the electronic apparatus 100. In other words, the control device 300 obtains a user's control command to control the external device 400.

The control device 300 includes a third network communicator circuit 330, a third processor 340, a user command obtainer 360, a voice recognition engine 370, etc.

The third network communicator circuit 330 performs network communication with the server 200. The third network communicator circuit 330 may transmit an obtained control command of an external device 400 to the server 200.

The third network communicator circuit 330 may for example include an RF circuit to transmit/obtain an RF signal to perform wireless communication with the server 200, and be configured to perform one or more communications among Wi-fi, Bluetooth, Zigbee, UWB, Wireless USB, and NFC.

The third processor 340 performs control to operate general elements of the control device 300. The third processor 340 may load a control program (containing one or more instructions) to perform such control operations and may include at least one CPU to execute the loaded control program.

The third processor 340 transmits a control command obtained through a user command obtainer 360 or a control command recognized by the voice recognition engine to the server 200 through the third network communicator circuit 330.

The user command obtainer 360 obtains a user's input and transmits the user's input to the third processor 340. The user command obtainer 360 may be actualized in various forms in accordance with a user's input methods, for example, a menu button displayed on a display, a remote control signal obtainer configured to obtain a remote control signal of a user's input obtained from the remote controller, a touch screen provided on the display and obtaining a user's touch input, a camera configured to detect a user's gesture input, a microphone configured to recognize a user's voice input, etc.

The voice recognition engine 370 recognizes (extracts) a control command for the external device 400 from a user's voice command uttered by the user. The voice recognition function of the voice recognition engine 370 may be carried out using a previously known voice recognition algorithm. For example, the voice recognition engine 370 may recognize a voice by extracting a voice feature vector of a voice signal, and comparing the extracted voice feature vector with voice recognition target information stored in a memory. Further, when the extracted voice feature vector is not matched with the voice recognition target information, a voice recognition result may be corrected by information of high similarity to thereby recognize a voice. Here, if there are a plurality of pieces of voice recognition target information of high similarity, a user may be allowed to select one of them.

The voice recognition engine 370 may be actualized by a CPU-resident embedded voice recognition engine 370 without limitations. For example, the voice recognition engine 370 may be actualized by a separate chip such as a microcomputer separated from the CPU.

When the voice recognition engine 370 recognizes "volume up", "volume down", "turn up the sound", "turn down the sound", or the like as a recognition result in a case where the IoT control target is a TV, the third processor 340 transmits a control command corresponding to the recognition result to the server 200 and makes the server control the TV.

When the voice recognition engine 370 recognizes "set the temperature level of the air conditioner higher through the TV", "set the temperature level of the air conditioner lower through the TV", "set the wind level of the air conditioner stronger through the TV", "set the wind level of the air conditioner weaker through the TV", or the like as a recognition result in a case where the IoT control target is the external device 400 (e.g. the air conditioner of the brand A), the third processor 340 transmits a control command corresponding to the recognition result to the server 200, and then transmits the control command again to the electronic apparatus (e.g. the TV) 100, thereby controlling the external device (e.g. the air conditioner of the brand A). Here, the control command may be configured under conditions that the control medium of "TV", the virtual control target of "the air conditioner of the brand A", and the operation commands for the air conditioner of the brand A of "the temperature level+", "the temperature level–" "the wind level+" and "the wind level–" are matched with one another.

The voice recognizable in the voice recognition engine 370 may include a speech corresponding to a control medium that includes a plurality of apparatuses such as a notebook computer, a computer, etc. in addition to a TV. The electronic apparatus and the external device may be connected in such a manner that a plurality of media, i.e. a plurality of electronic apparatuses are connected to the control target, i.e. a single external device, or one medium, i.e. a single electronic apparatus may be connected to the plurality of external devices.

The voice recognizable in the voice recognition engine 370 may include a speech corresponding to a control target that includes a plurality of external devices such as "refrigerator", "door lock", "audio system", "light", etc. in addition to the "air conditioner of the brand A".

The voice recognizable in the voice recognition engine 370 may include a speech corresponding to a control command that includes various control commands implemented in the air conditioner, such as "shutdown/stop", "subtropics", "cooling mode/cooling", "dehumidifying mode/dehumidification", "heating mode/heating", etc. in addition to the temperature level+", "the temperature level–" "the wind level+" and "the wind level–".

The voice recognition engine 370 may further include a voice converter (not shown) configured to convert a voice command obtained in a user command obtainer 360 into an electric audio signal. The audio signal converted by the voice converter is given in a pulse code modulation (PCM) form or a compressed audio waveform. Here, the voice converter may be actualized by an analog/digital (A/D) converter that digitizes a user's voice command.

The external device 400 includes a fourth IR communicator circuit 420 and a fourth processor 440. The external device 400 will be called a legacy device having no network communication functions or a non-connected device for which a network connection is turned off. The external device 400 may be controlled by the first IR signal of the remote controller 402 or the second IR signal of the electronic apparatus 100.

The fourth IR communicator circuit 420 obtains the first IR signal or the second IR signal, in which command information is included to control operations of the external device 400.

The fourth processor 440 controls the operations of the external device 400, based on the obtained first or second IR signal. The fourth processor 440 performs control to operate general elements of the external device 400. The fourth processor 440 may load a control program (containing one or more instructions) to perform such control operations and may include at least one CPU to execute the loaded control program.

Figure 3:
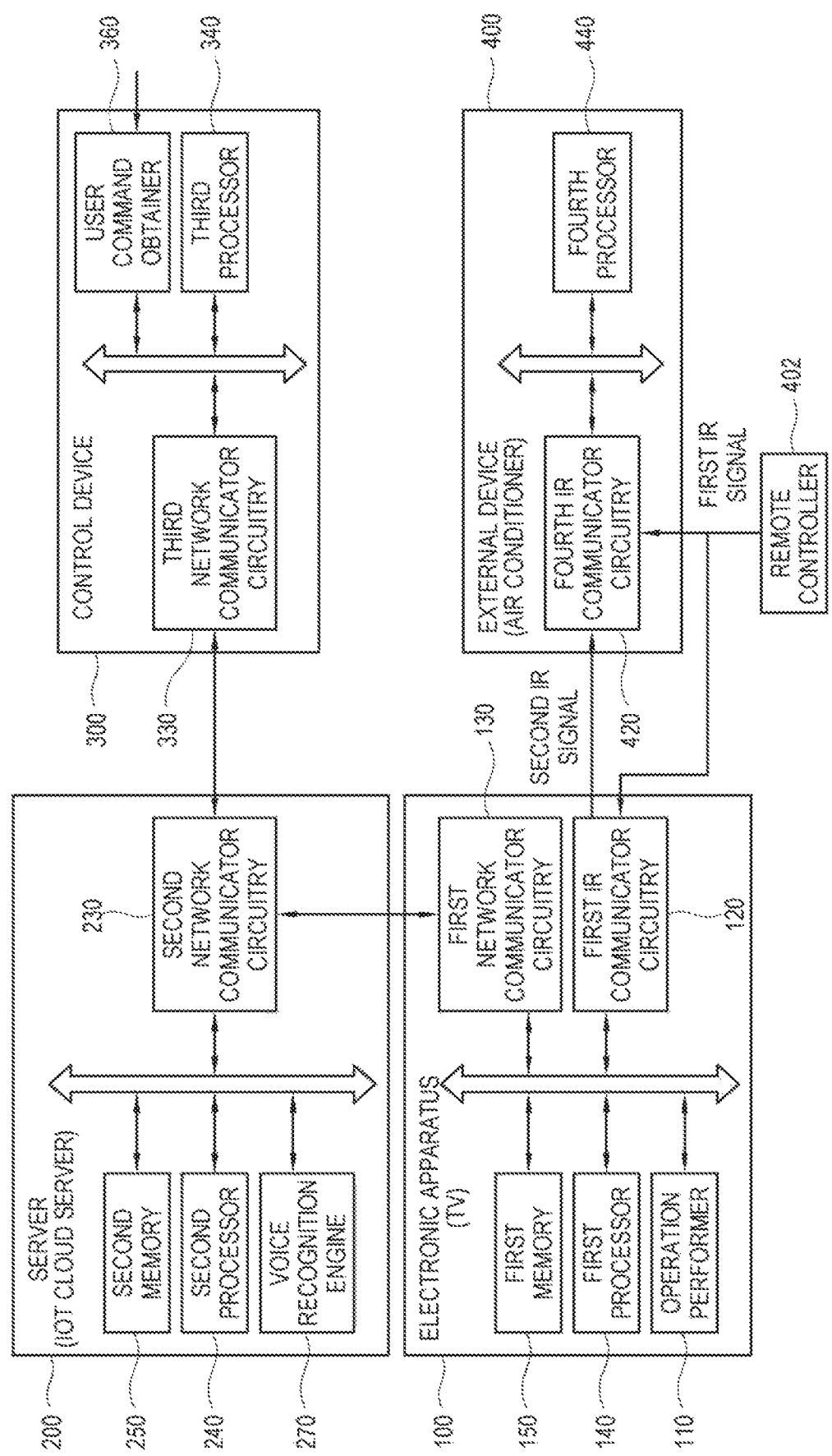
FIG. 3 is a block diagram of an electronic apparatus control system according to an embodiment.

FIG. 3 is a block diagram of an electronic apparatus control system according to an embodiment. As shown therein, an electronic apparatus control system 1' includes the electronic apparatus 100 serving as the control medium, the server 200, the control device 300, and the external device 400 serving as the control target. Below, the electronic apparatus control system 1' will be described focusing on different parts from those of the embodiment shown in FIG. 2, and repetitive descriptions will be omitted for conciseness.

In the embodiment shown in FIG. 3, a voice recognition engine is not provided in the control device 300 but rather a voice recognition engine 270 is included in the server 200. In some situations, it may be rather difficult to have a voice recognition function in the control device 300 because the control device 300 substantially employs a universal mobile device such as a smart phone or the like in which such a function may not always be provided. On the other hand, it is easier to have the voice recognition function at the server 200 because the server 200 is used as an apparatus dedicated to control various control targets, e.g., a plurality of external devices 400.

Referring to FIG. 3, in the state that the external device 400 has been virtually registered as the control target in the server 200, the control device 300 obtains a user's voice command through the user command obtainer 360. The control device 300 directly transmits the obtained voice command of the user to the server 200 through the third network communicator circuit 330. Here, the control device 300 is used to obtain and transmit a user's voice command, for example, "set the temperature level of the air conditioner higher through the TV", "set the temperature level of the air conditioner lower through the TV", "set the wind level of the air conditioner stronger through the TV", "set the wind level of the air conditioner weaker through the TV", or the like to the server 200.

The server 200 recognizes (i.e., extracts) the control command from the voice command of the user, which is obtained from the control device 300, through the voice recognition engine 270. The server 200 transmits the control command, for example, "the temperature level+ in the air conditioner of the brand A" to the control medium, for example, the TV, which is contained in the control command. Here, the server 200 may directly transmit the second IR signal code about "the temperature level+ in the air conditioner of the brand A", or send only content of the control command to the TV so that the TV can generate the second IR signal code corresponding to "the temperature level+ in the air conditioner of the brand A".

Figure 4:
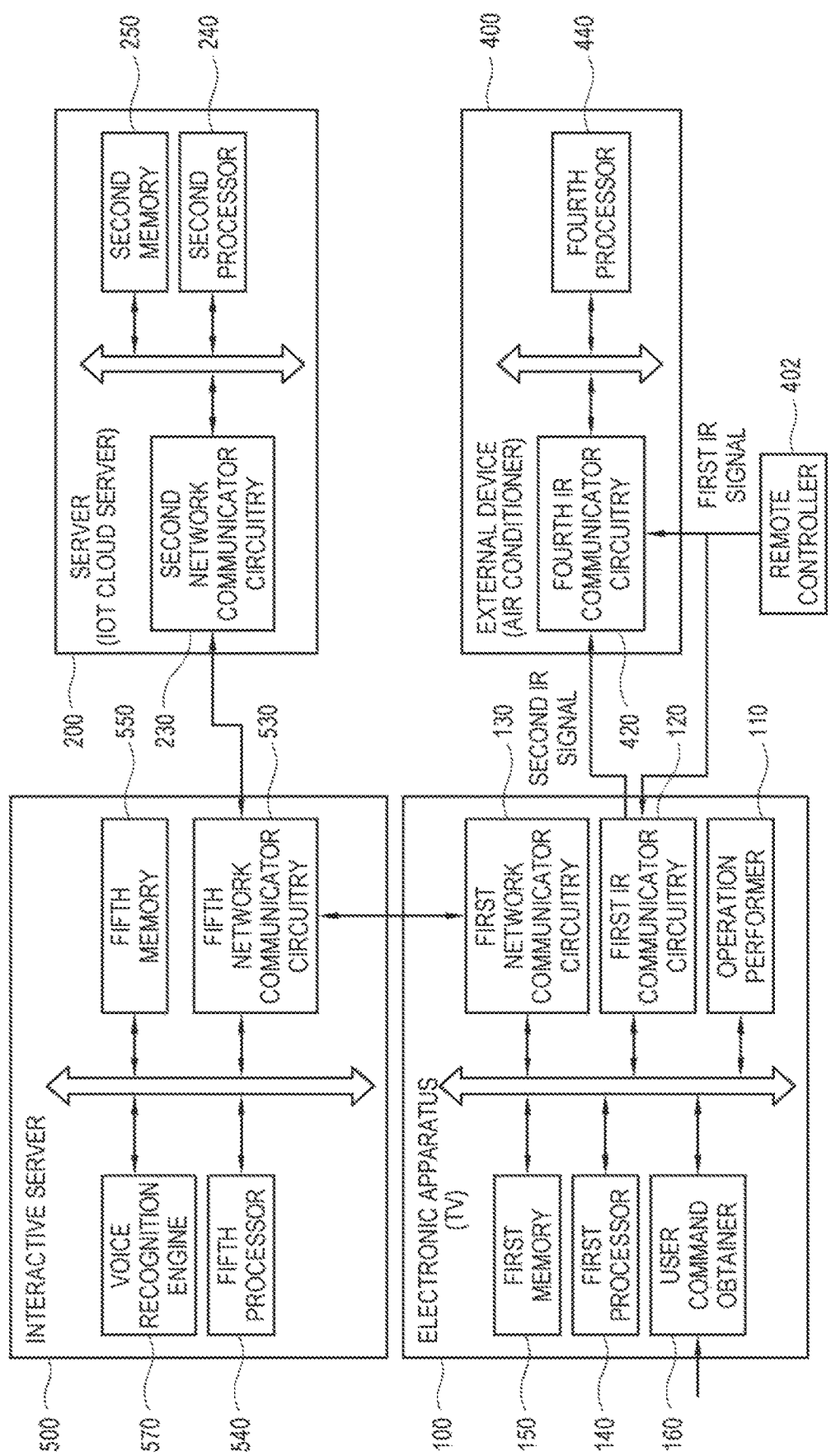
FIG. 4 is a block diagram of an electronic apparatus control system according to an embodiment.

FIG. 4 is a block diagram of an electronic apparatus control system according to an embodiment. As shown in FIG. 4, an electronic apparatus control system 1" includes the electronic apparatus 100, the server 200, the external device 400, and an interactive server 500. The interactive server 500 is provided between the electronic apparatus 100 and the server 200. Further, the electronic apparatus control system 1" shown in FIG. 4 directly obtains a user's voice command from the electronic apparatus 100 unlike in the embodiments of FIGS. 2 and 3 in which the control device 300 obtains the voice command of the user. The operations of analyzing the first IR signal of the external device 400 and registering the external device 400 as the virtual control target are the same as those described in the first and second embodiments of FIGS. 2 and 3, and thus repetitive descriptions thereof will be omitted for conciseness.

The electronic apparatus 100, i.e., the control medium for the external device 400, includes the operation performer 110, the first IR communicator circuit 120, the first network communicator circuit 130, the first processor 140, the first memory 150 and a user command obtainer 160.

The user command obtainer 160 obtains a user's command and transmits the obtained command to the first processor 140. The user command obtainer 160 may be actualized in various forms in accordance with a user's input methods, for example, a menu button displayed on the display, a remote control signal obtainer configured to obtain a remote control signal of a user's command obtained from the remote controller, a touch screen provided on the display and obtaining a user's touch input, a camera configured to detect a user's gesture input, a microphone configured to recognize a user's voice input, etc.

For example, when obtaining a user's voice command through the user command obtainer 160, the first processor 140 directly transmits the obtained voice command to the interactive server 500 through the first network communicator circuit 130. Here, the voice command of the user may for example include such a speech as "set the temperature level of the air conditioner higher through the TV", "set the temperature level of the air conditioner lower through the TV", "set the wind level of the air conditioner stronger through the TV", "set the wind level of the air conditioner weaker through the TV", etc.

The interactive server 500 includes a fifth network communicator circuit 530, a fifth processor 540, a fifth memory 550, and a voice recognition engine 570.

The fifth network communicator circuit 530 obtains a user's voice command from the first network communicator circuit 130 of the electronic apparatus 100 to the fifth processor 540.

The fifth processor 540 transmits the voice command of the user to the voice recognition engine 570.

The voice recognition engine 570 recognizes a control command, for example, "the temperature level+ of the air conditioner through the TV", "the temperature level- of the air conditioner through the TV", "the wind level+ of the air conditioner through the TV", "the wind level- of the air conditioner through the TV", etc. by processing the voice command of the user, and transmits the recognized control command to the fifth processor 540. Like this, the control command extracted from the voice command of the user contains command information that includes a control medium (e.g. the TV), a control target (e.g. the air conditioner), and command information (e.g. the temperature level+, the temperature level-, the wind level+, the wind level-, etc.).

The fifth processor 540 transmits the recognized control command to the server 200 through the fifth network communicator circuit 530.

The server 200 includes the second network communicator circuit 230, the second processor 240, and the second memory 250.

The second network communicator circuit 230 transmits the control command from the interactive server 500 to the second processor 240.

The second processor 240 identifies whether the external device, i.e. the control target, for example, "the air conditioner of the brand A" has been registered as the virtual control target in the control command. When "the air conditioner of the brand A" has been registered as the virtual control target, the second processor 240 transmits the control command to the electronic apparatus 100 via the second network communicator circuit 230. On the other hand, when the air conditioner of the brand A" has not been registered as the virtual control target, the second processor 240 feeds a "fail return message", which states that "the air conditioner of the brand A" is a nonregistered control target, to the interactive server 500 through the second network communicator circuit 230.

When obtaining the "fail return message" from the server 200 through the fifth network communicator circuit 530, the fifth processor 540 of the interactive server 500 transmits the control command to the electronic apparatus 100 through the fifth network communicator circuit 530.

The first processor 140 of the electronic apparatus 100 generates the second IR signal code corresponding to the command information based on, for example, "the temperature level+ in the air conditioner", "the temperature level- in the air conditioner", "the wind level+ in the air conditioner", "the wind level- in the air conditioner", and the like control command transmitted from the server 200 or the interactive server 500 via the first network communicator circuit 130, and makes the first IR communicator circuit 120 emit the second IR signal.

Figure 5:
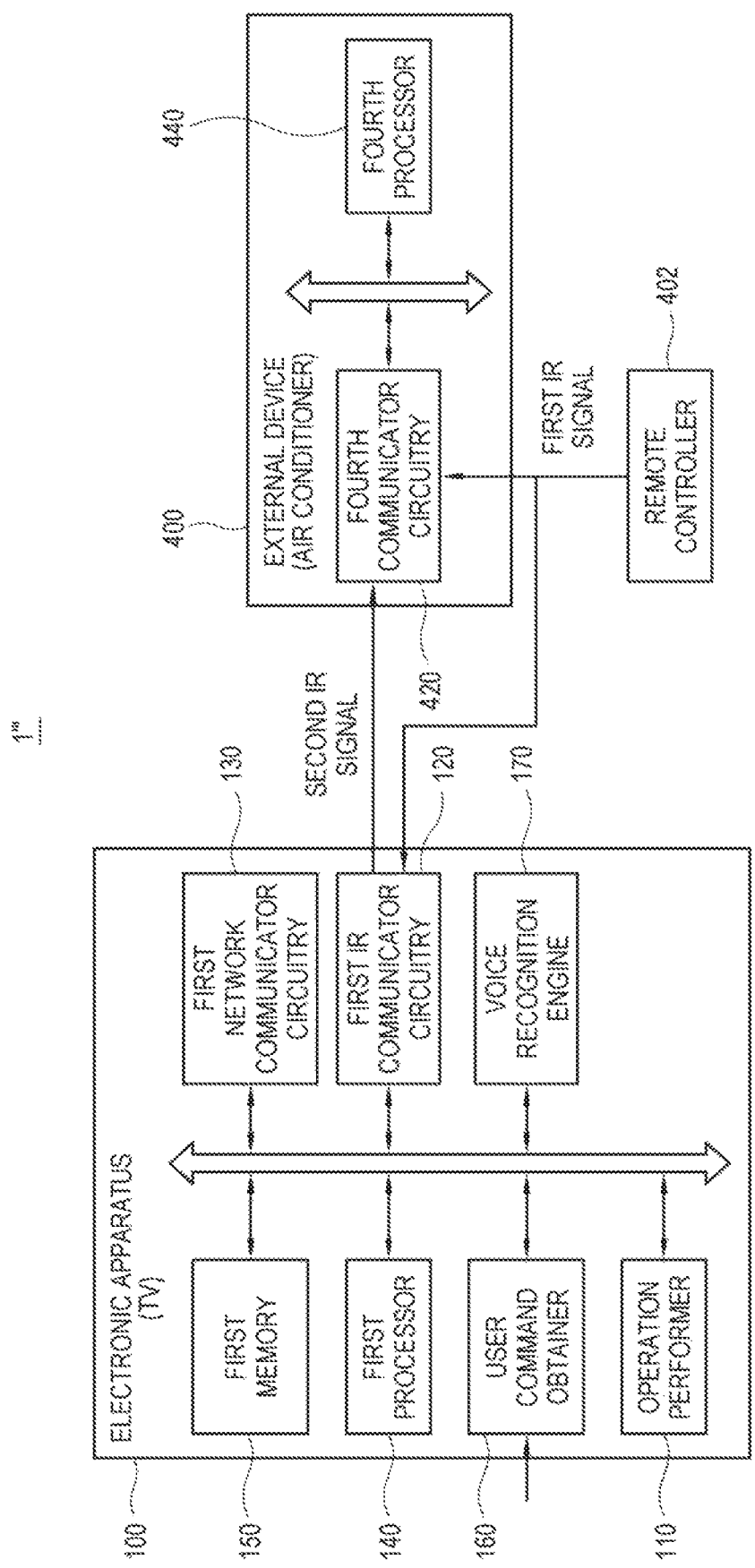
FIG. 5 is a block diagram of an electronic apparatus control system according to an embodiment.

FIG. 5 is a block diagram of an electronic apparatus control system according to an embodiment. An electronic apparatus control system 1''' includes the electronic apparatus 100 and the external device 400. In the electronic apparatus control system 1''', the electronic apparatus 100 may function as a server in itself instead of the server 200 and also function as the control device 300.

The electronic apparatus 100 includes the operation performer 110, the first IR communicator circuit 120, the first network communicator circuit 130, the first processor 140, the first memory 150, the user command obtainer 160, and a voice recognition engine 170.

The operation performer 110 may for example include the display, the image obtainer, the image processor, the audio processor, and the like that performs substantial operations of the electronic apparatus 100.

The first IR communicator circuit 120 obtains an infrared signal from the remote controller (not shown) of the electronic apparatus 100 to control the operation performer 110. Further, the first IR communicator circuit intercepts the first IR signal emitted from the remote controller 402 of the external device 400.

The first network communicator circuit 130 performs network communications with other external devices.

The first processor 140 performs control to operate general elements of the electronic apparatus 100. The first processor 140 may load a control program (containing one or more instructions) to perform such control operations and may include at least one (CPU) to execute the loaded control program.

The first processor 140 may for example analyze the first IR signal of the remote controller 402 of the external device 400, which is intercepted through the first IR communicator circuit 120, and obtain a device profile showing the external device 400 through the analysis of the first IR signal. Here, the device profile may show that the external device 400 is "the air conditioner of the brand A" by way of example.

The first processor 140 identifies whether "the air conditioner of the brand A" has been registered as the control target (e.g. the virtual IoT device). When "the air conditioner of the brand A" has not been registered as the control target and the electronic apparatus 100 is operating, the first processor 140 asks a user through the operation performer 110, for example, the display whether the user wants to register "the air conditioner of the brand A" as the control target. When "the air conditioner of the brand A" has not been registered as the control target and the electronic apparatus 100 is not operating, the first processor 140 operates the operation performer 110, for example, the display to ask a user whether the user wants to register "the air conditioner of the brand A" as the control target, or to keep a standby mode and display a control-target registration event for asking a user whether the user wants to register "the air conditioner of the brand A" as the control target when the user turns on the electronic apparatus 100.

The first processor 140 registers the external device 400 (e.g. the air conditioner of the brand A) as the control target (e.g. the virtual IoT device) based on the device profile when a user selects the registration of the control target with regard to the external device 400.

The first memory 150 is configured to store data without limitations. The first memory 150 is accessed by the first processor 140, and allows the first processor 140 to read, load, write, modify, delete, update, etc. the data. The data stored in the first memory 150 may for example include collected device profile data of the control target, infrared code data of products according to manufacturers, control target registration data, etc. The first memory 150 may include an operating system, various applications executable on the operating system, image data, appended data, etc. The first memory 150 includes a program (application) that performs a code analysis of the first IR signal, conversion into the second IR signal corresponding to the control command, etc.

The user command obtainer 160 obtains a user's input, for example, a user's voice command given in the form of a speech, and transmits the user's input to the first processor 140. The user command obtainer 160 may be actualized in various forms in accordance with a user's input methods, for example, a menu button displayed on a display, a remote control signal obtainer configured to obtain a remote control signal of a user's input obtained from the remote controller, a touch screen provided on the display and obtaining a user's touch input, a camera configured to detect a user's gesture input, a microphone configured to recognize a user's voice input, etc.

When obtaining a user's voice command through the user command obtainer 160, the first processor 140 transmits the voice command to the voice recognition engine 170. Here, the voice command of the user may for example include a user's speech such as "set the temperature level of the air conditioner higher through the TV", "set the temperature level of the air conditioner lower through the TV", "set the wind level of the air conditioner stronger through the TV", "set the wind level of the air conditioner weaker through the TV", etc.

The voice recognition engine 170 recognizes a control command, for example, "the temperature level+ of the air conditioner through the TV", "the temperature level− of the air conditioner through the TV", "the wind level+ of the air conditioner through the TV", "the wind level− of the air conditioner through the TV", etc. by processing the voice command of the user, and transmits the recognized control command to the first processor 140. In this way, the control command extracted from the voice command of the user contains a control medium, a control target, and command information.

The first processor 140 generates a second IR signal code for controlling the external device 400 (e.g. the air conditioner of the brand A) based on the control command, and emits a second IR signal through the first IR communicator circuit 120. Here, the first processor 140 ignores the control command when the first processor 140 is the same as the control medium in a control command system.

The electronic apparatus 100 may make a voice command based on a speech or a remote control by registering a plurality of external devices other than one external device 400 (e.g., the air conditioner of the brand A) as the virtual control targets.

Figure 6:
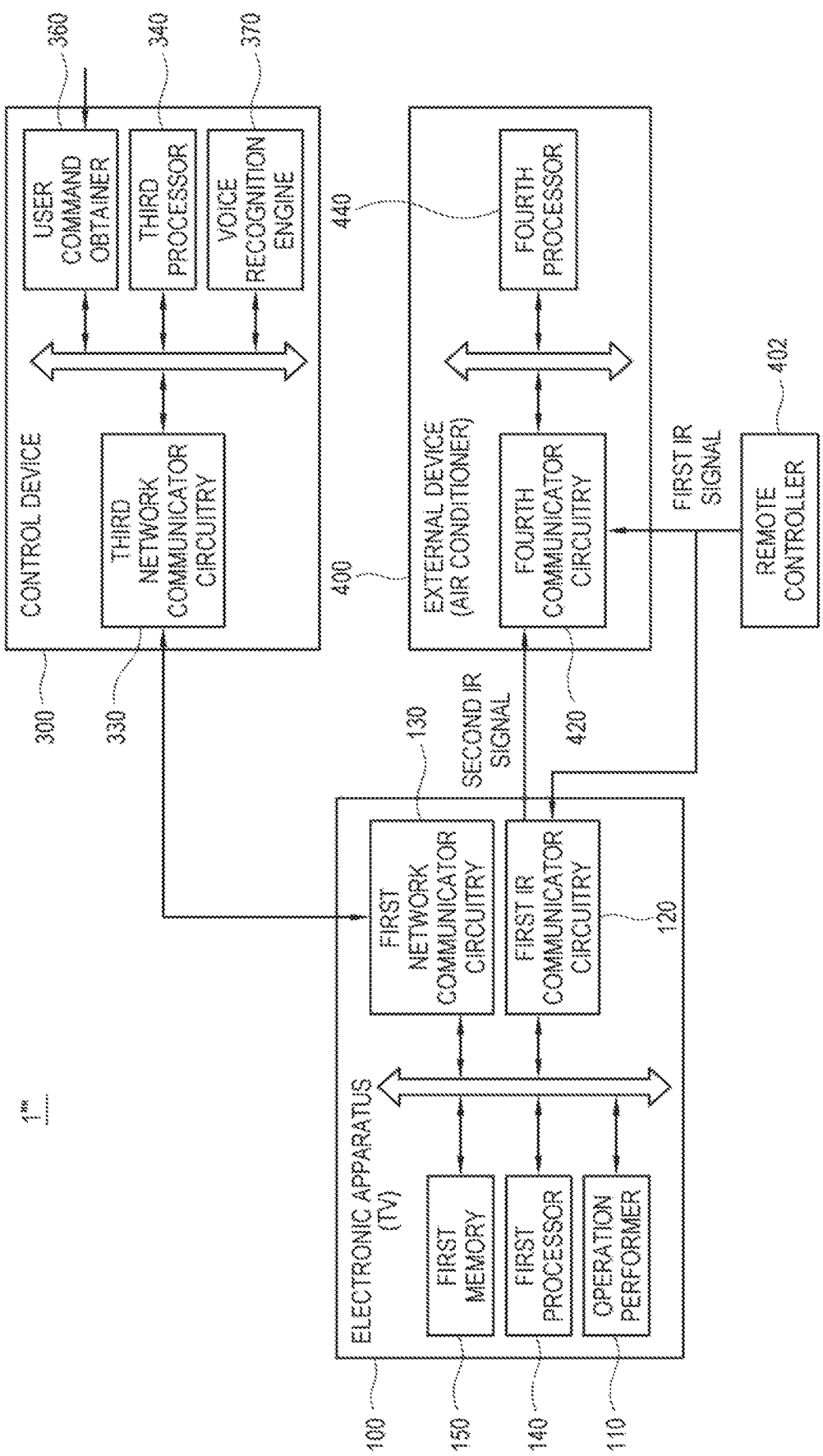
FIG. 6 is a block diagram of an electronic apparatus control system according to an embodiment.

FIG. 6 is a block diagram of an electronic apparatus control system according to an embodiment. An electronic apparatus control system 1''' includes the electronic apparatus 100, the control device 300, and the external device 400. The electronic apparatus 100 functions as a server in itself instead of the server 200. Unlike the electronic apparatus control system of FIG. 5 that extracts the control command by obtaining a user's voice command in itself, the electronic apparatus control system 1''' obtains the control command extracted in the control device 300 through network communication. The configurations and operations of the electronic apparatus 100, the control device 300 and the external device 400 are similar to those of FIG. 2, and therefore descriptions thereof will be omitted for conciseness. However, as compared with the control device 300 in the electronic apparatus control system 1 of FIG. 2 that transmits the control command to the electronic apparatus 100 via the serve 200, the control device 300 in the electronic apparatus control system 1''' of FIG. 6 directly transmits the control command to the electronic apparatus 100.

Figure 7:
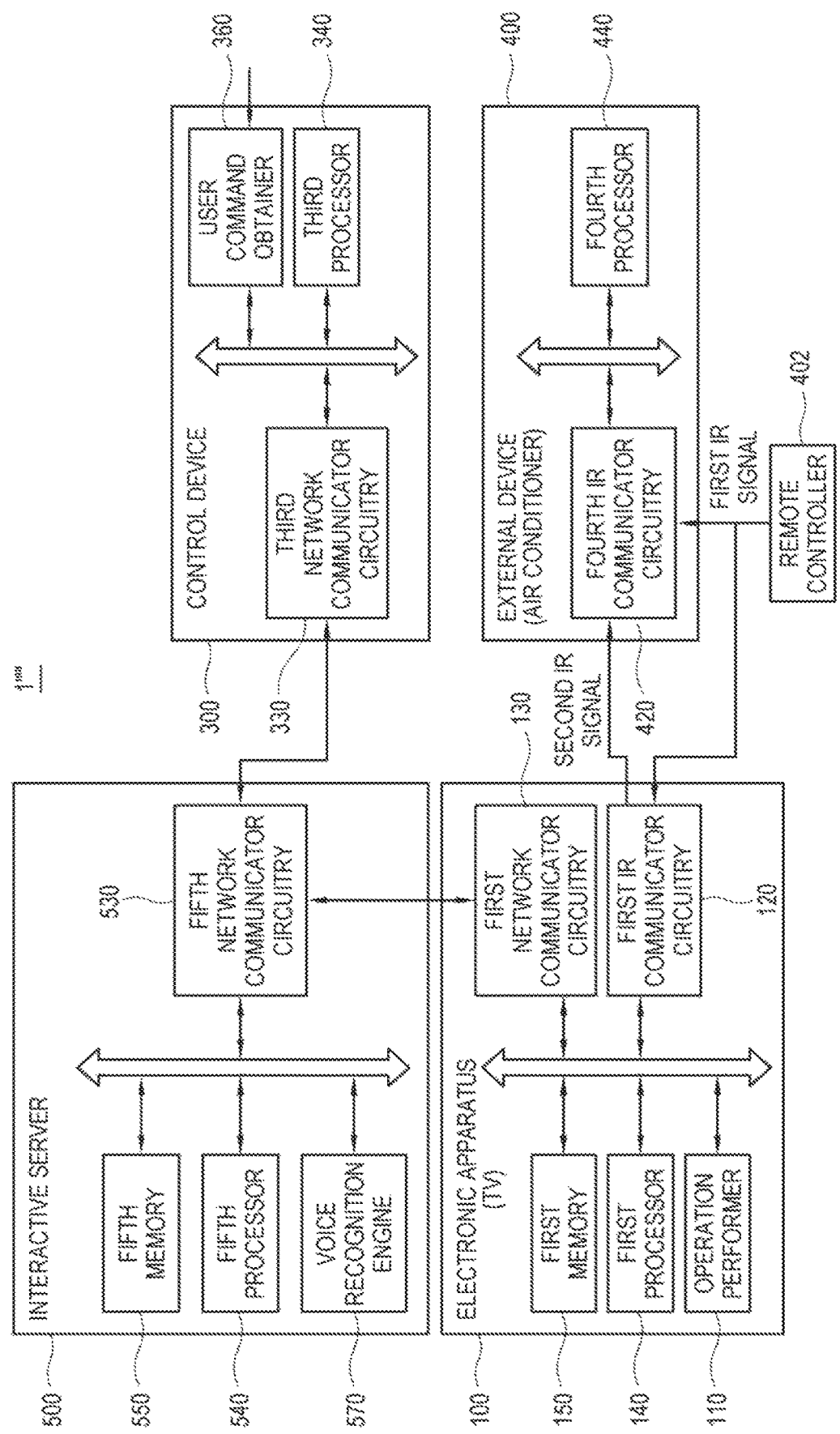
FIG. 7 is a block diagram of an electronic apparatus control system according to an embodiment.

FIG. 7 is a block diagram of an electronic apparatus control system according to an embodiment. The electronic apparatus control system 1'''' of FIG. 7 includes the electronic apparatus 100, the control device 300, the external device 400, and the interactive server 500. The interactive server 500 is provided between the electronic apparatus 100 and the control device 300 and extracts a control command by processing a user's voice command given in the form of a speech obtained through the control device 300. In the electronic apparatus control system 1'''', the interactive server 500 performs functions of the server 200. In the electronic apparatus control system 1'''' of FIG. 7, the control device 300 obtains a user's voice command given in the form of a speech and then transmits the obtained voice command to the interactive server 500.

The configurations and operations of the electronic apparatus 100, the control device 300 and the external device 400 are similar to those of FIG. 3, and thus descriptions thereof will be omitted for conciseness.

However, the electronic apparatus control system 1'''' of FIG. 7 is different from that of the embodiment shown in FIG. 3 in that the interactive server 500 performs the functions as the server 200. In some embodiments, the interactive server 500 may perform only a function of recognizing the control command from a user's voice command, and the registration of the external device 400 as the virtual control target may be performed by the electronic apparatus 100.

Figure 8:
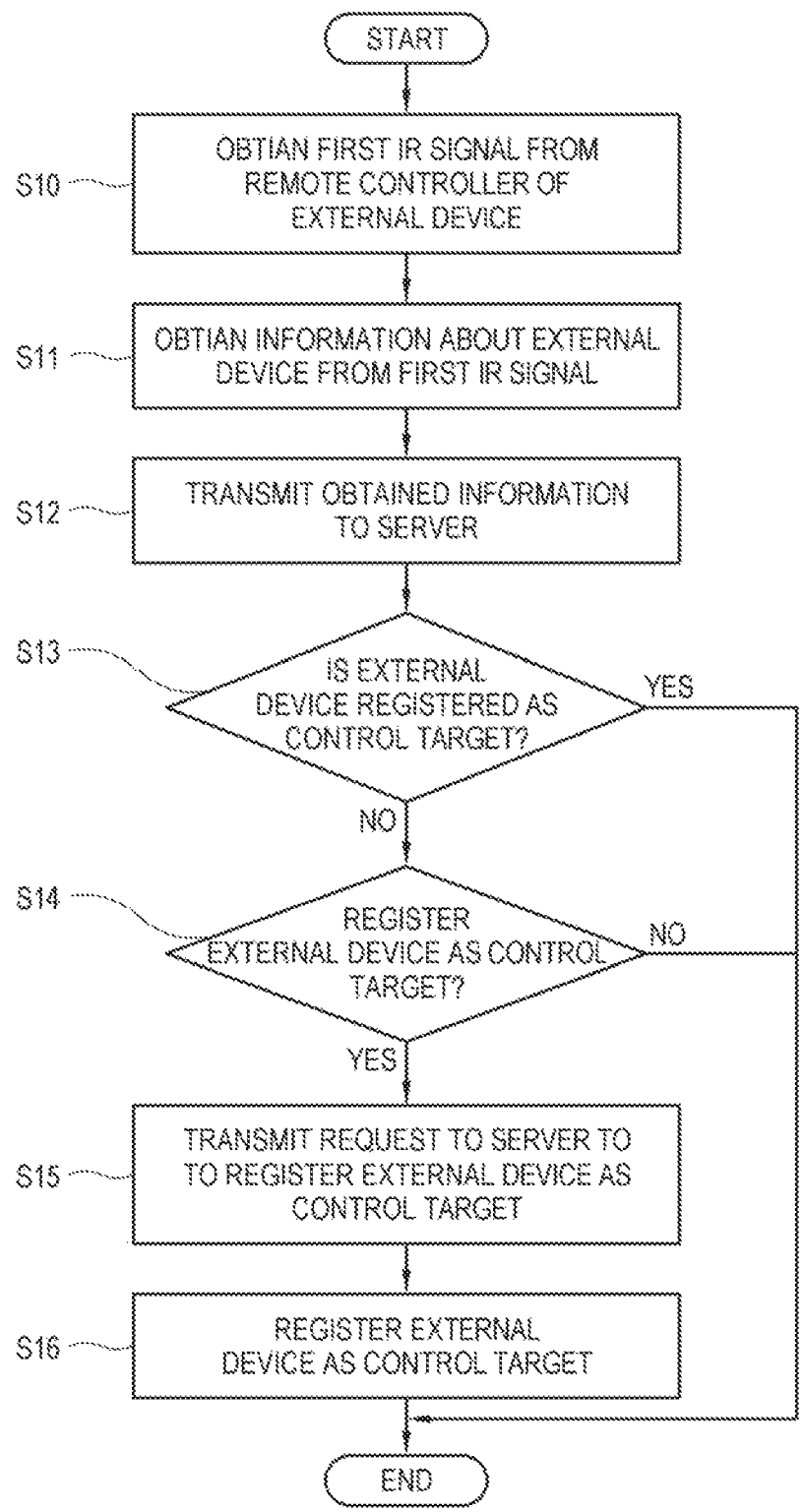
FIG. 8 is a flowchart of registering an external device of the electronic apparatus control system of FIG. 1, according to an embodiment.

Below, a process of registering an external device through the electronic apparatus 100 and the server 200 in FIG. 2 will be described with reference to FIG. 8, according to an embodiment.

At operation S10, the first IR communicator circuit 120 of the electronic apparatus 100 obtains the first IR signal from the remote controller 402 of the external device 400. The operation of obtaining the first IR signal by the electronic apparatus 100 may include intercepting the first IR signal emitted while a user controls the external device 400 or obtaining the first IR signal intended by a user to be emitted toward the electronic apparatus 100.

Figure 9:
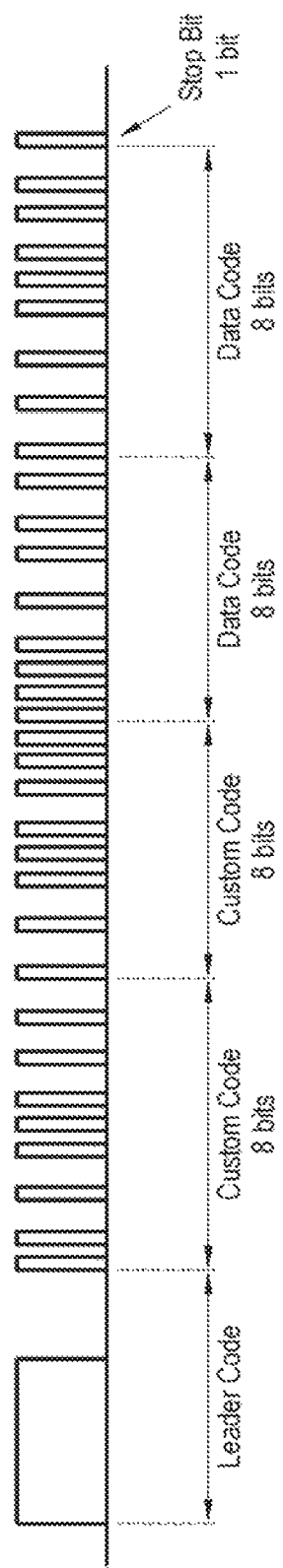
FIG. 9 illustrates a structure of an infrared signal, according to an embodiment.

At operation S11, the first processor 140 of the electronic apparatus 100 obtains information about the external device 400 from the first IR signal. The first processor 140 may analyze a device profile of the external device based on the first IR signal. FIG. 9 illustrates a waveform showing an example of the first IR signal. As shown therein, the first IR signal may be a national electrical code (NEC). The first IR signal may include a leader code, a custom code, an inverted custom code, a data code, and an inverted data code. The custom code denotes a code for identifying a manufacturer, and the inverted custom code denotes a custom code for an error check. The data code denotes a code based on data for controlling a remote controller of an external device, and the inverted data code denotes a data code for an error check.

The first processor 140 of the electronic apparatus 100 identifies the manufacturer of the external device 400 based on the custom code of the first IR signal having the foregoing structure, and identifies the product type of the external device 400 based on the data code. In other words, a code value involved in the data code is varied depending on the product type of the external device 400, and it is therefore possible to easily identify the product type of the external device 400 based on a templet where the code values of the data code are tabulated matching the product types of the external devices.

At operation S12, the first processor 140 of the electronic apparatus 100 transmits the obtained information of the external device to the server 200.

At operation S13, the second processor 240 of the server 200 determines whether the external device has been registered as the control target, based on the information about the external device, e.g., brand and product names.

When the external device has already been registered as the control target (S13, YES), content of registration is fed back to the electronic apparatus 100 and the process is terminated. On the other hand, when the external device has not already been registered as the control target (S13, NO), a message of non-registration is fed back to the electronic apparatus 100 and operation S14 is performed.

Figure 10:
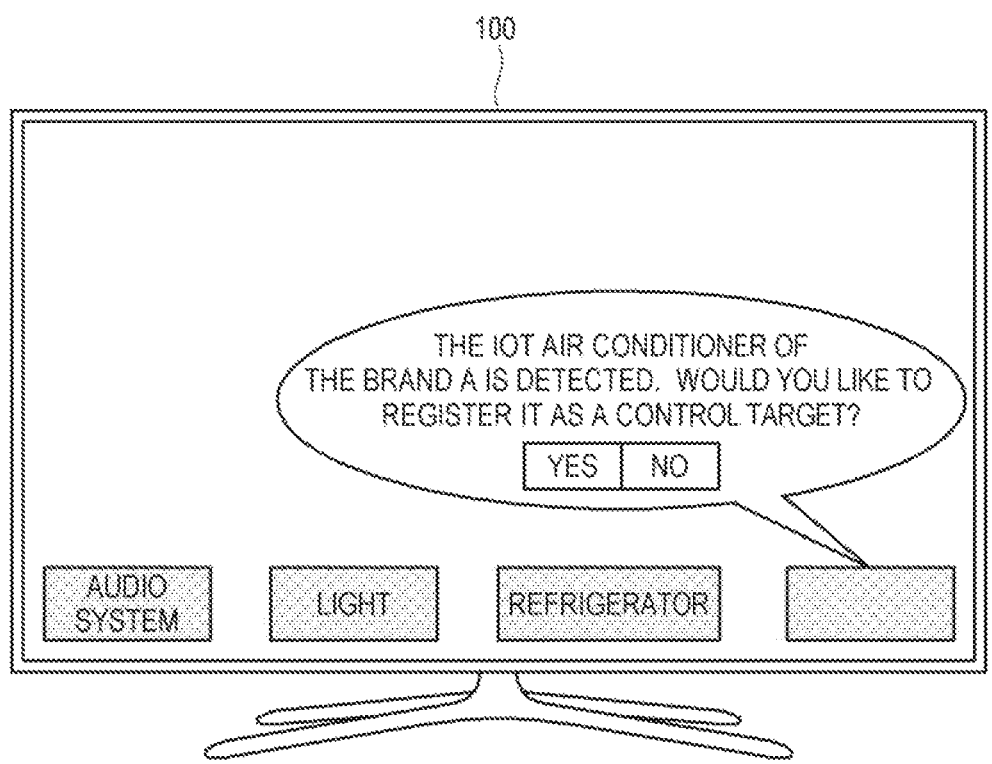
FIG. 10 illustrates that a TV displays a control target registration user interface (UI) for an external device, according to an embodiment.

At operation S14, it is determined whether to register the external device as a control target. When the first processor 140 of the electronic apparatus 100 obtains the non-registration message saying that the external device has not been registered, a registration user interface UI for asking a user whether to register the external device as the control target is displayed on the display. As shown in FIG. 10, a display screen displays an audio system, a light, and a refrigerator, which have already been registered as control targets, and a registration UI for asking whether to register a newly detected "air conditioner of a brand A" as the control target. When a user does not want to register the external device as the control target on the registration UI (S14, NO), the process for the registration is terminated.

When a user wants to register "the air conditioner of the brand A" as the control target (S14, YES), a request is transmitted to the server 200 to register the external device a control target in operation S15. That is, the server 200 is requested to register "the air conditioner of the brand A".

At operation S16, the external device is registered as a control target. That is, the second processor 240 of the server 200 registers "the air conditioner of the brand A" as the virtual control target in response to the registration request of the electronic apparatus 100.

In this case, the second processor 240 of the server 200 may register the electronic apparatus 100 for performing various functions of "the air conditioner of the brand A". In this case, when obtaining a control command of "set the temperature level of the air conditioner higher", the second processor 240 identifies the control command as the function of the electronic apparatus 100 and transmits the control command to the electronic apparatus 100.

Meanwhile, the second processor 240 may register the electronic apparatus 100 as an intermediate medium for controlling "the air conditioner of the brand A". The second processor 240 registers "the air conditioner of the brand A" as the virtual IoT device distinguished from the existing IoT devices, by matching the electronic apparatus 100 capable of applying IR control to "the air conditioner of the brand A". In this case, when obtaining a control command of "set the temperature level of the air conditioner higher through the TV", the second processor 240 transmits the control command to the electronic apparatus 100 via the control medium, i.e. the electronic apparatus 100.

Figure 11:
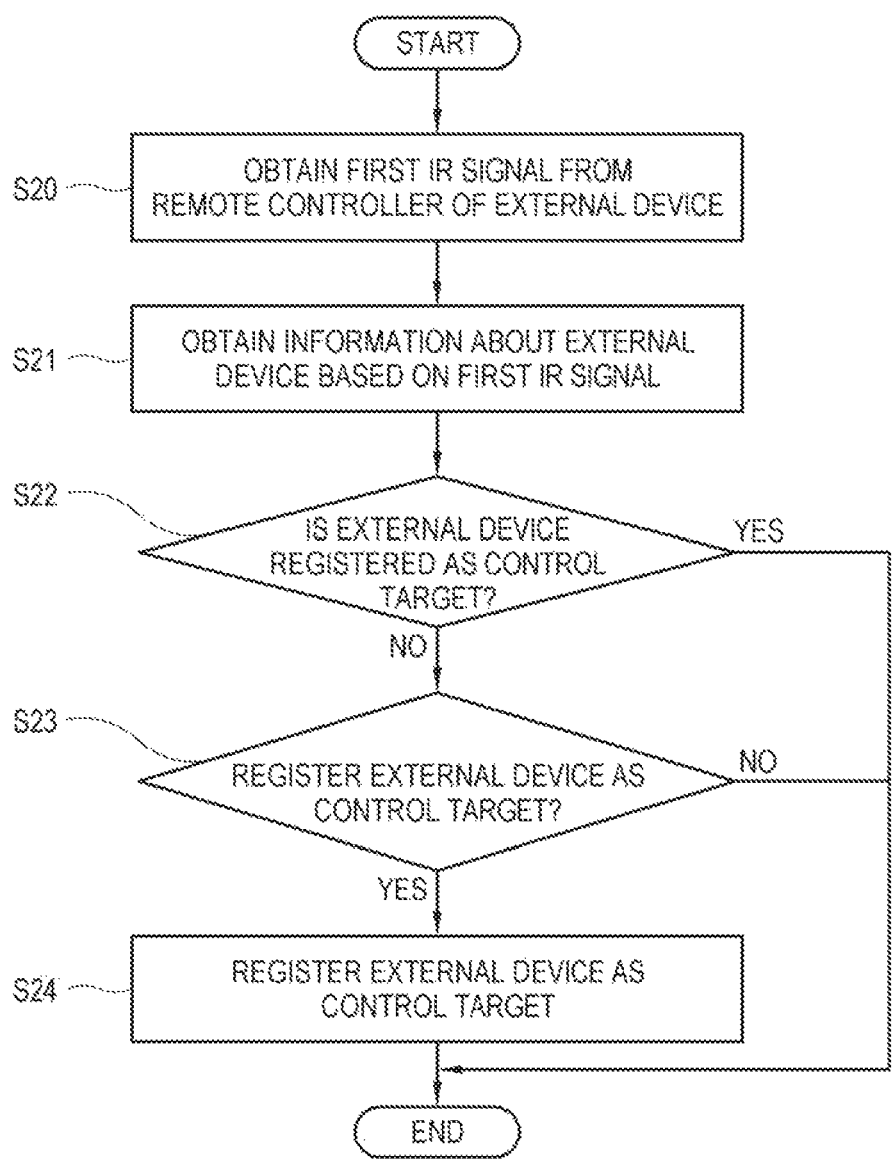
FIG. 11 is a flowchart of registering a control target in an external device of the electronic apparatus control system of FIG. 5, according to an embodiment.

Below, a process of registering an external device through the electronic apparatus of FIG. 5 will be described with reference to FIG. 11, according to an embodiment.

At operation S20, the first IR communicator circuit 120 of the electronic apparatus 100 obtains the first IR signal from the remote controller 402 of the external device 400.

At operation S21, the first processor 140 obtains information about the external device 400 from the first IR signal. That is, the first processor 140 may analyze a device profile of the external device based on the first IR signal.

The first processor 140 identifies the manufacturer of the external device 400 based on the custom code of the first IR signal having the foregoing structure described above, and identifies the product type of the external device 400 based on the data code. In other words, a code value of the data code is varied depending on the product types of the external device 400, and therefore the product type of the external device 400 is easily identified based on a template where the code values of the data code are tabulated matching the product types of the external device.

At operation S22, the first processor 140 of the electronic apparatus 100 determines whether the external device has been registered as the control target. When it is identified that the external device has already been registered as the control target (S22, YES), the process for the registration is terminated.

When the external device has not been registered as the control target (S22, NO), it is determined whether to register the external device as a control target in operation S23. For example, a registration UI for asking whether to register the external device as the control target is displayed on the display. When it is determined not to register the external device as the control target (S23, NO), the process for the registration is terminated.

When it is determined to register the external device 400 as the control target (S23, YES), the external device is registered as a control target in operation S24. For example, the external device 400 (e.g. the air conditioner of the brand A) is registered as the control target, "the air conditioner of the brand A" is registered as the virtual control target.

Figure 12:
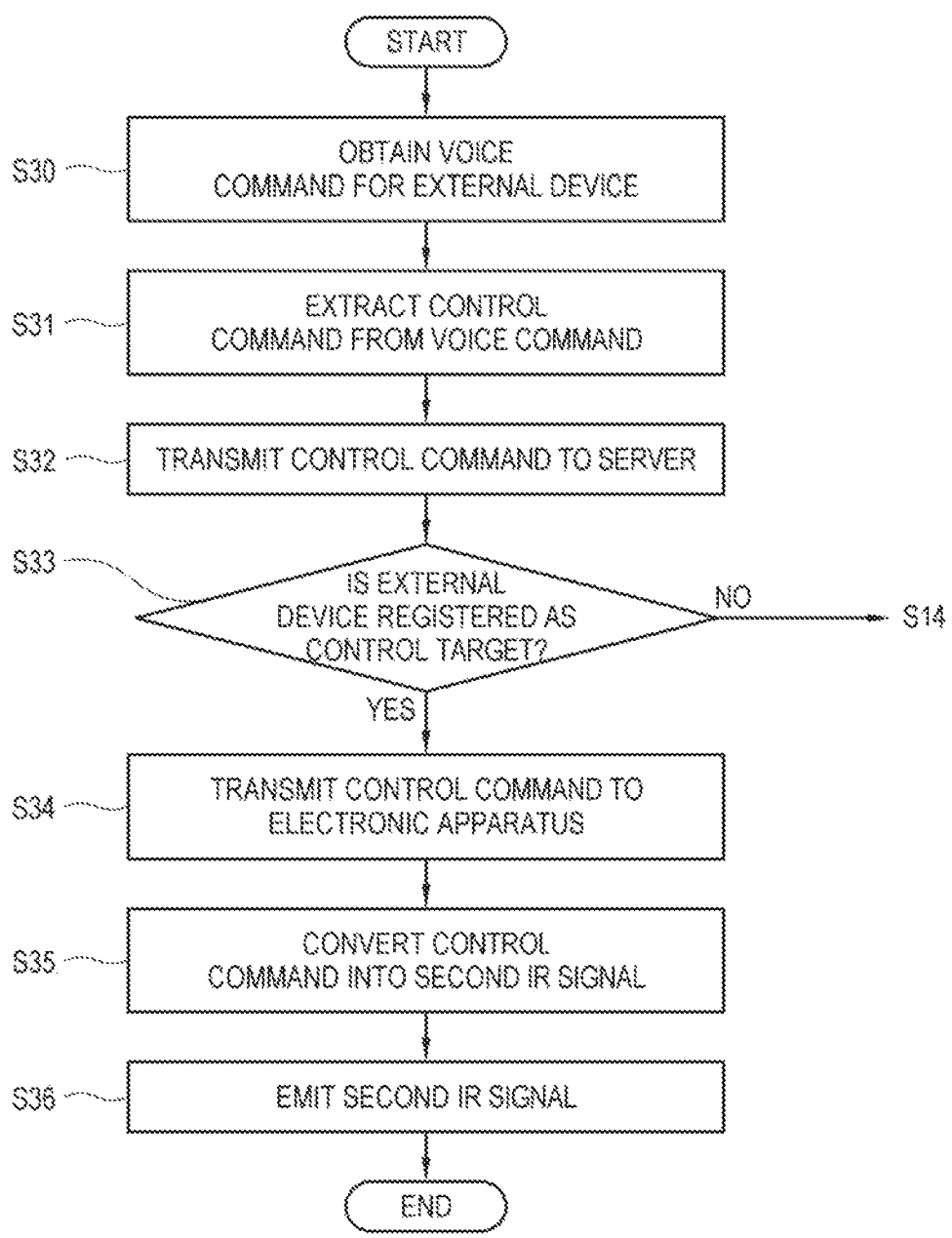
FIG. 12 is a flowchart of controlling an external device through a server and an electronic apparatus of the electronic apparatus control system of FIG. 1, according to an embodiment.

Referring to FIG. 12, a process of controlling an external device through the server and the electronic apparatus of FIG. 2 will be described, according to an embodiment.

At operation S30, the control device 300 obtains a voice command for controlling the external device. For example, the control device 300 obtains, for example, "set the temperature level of the air conditioner higher through the TV", with regard to the external device 400.

At operation S31, the control device 300 extracts a control command from the voice command of the user.

At operation S32, the control device 300 transmits the extracted control command to the server.

At operation S33, the server 200 determines whether the external device 400 targeted for the control command has been registered as the control target. When the external device 400 has not been registered as the control target yet (S33, NO), the operation S14 of FIG. 9 is performed for the registration.

When the external device 400 has already been registered as the control target (S33, YES), the server 200 transmits the control command to the electronic apparatus 100 at operation S34. In some embodiments, the server 200 may transmit the second IR signal code instead of the control command.

At operation S35, the first processor 140 of the electronic apparatus 100 converts the control command obtained from the server into the second IR signal code corresponding to the command information of the external device 400.

At operation S36, the first IR communicator circuit 120 of the electronic apparatus 100 emits the second IR signal corresponding to the second IR signal code (i.e. the command information).

Figure 13:
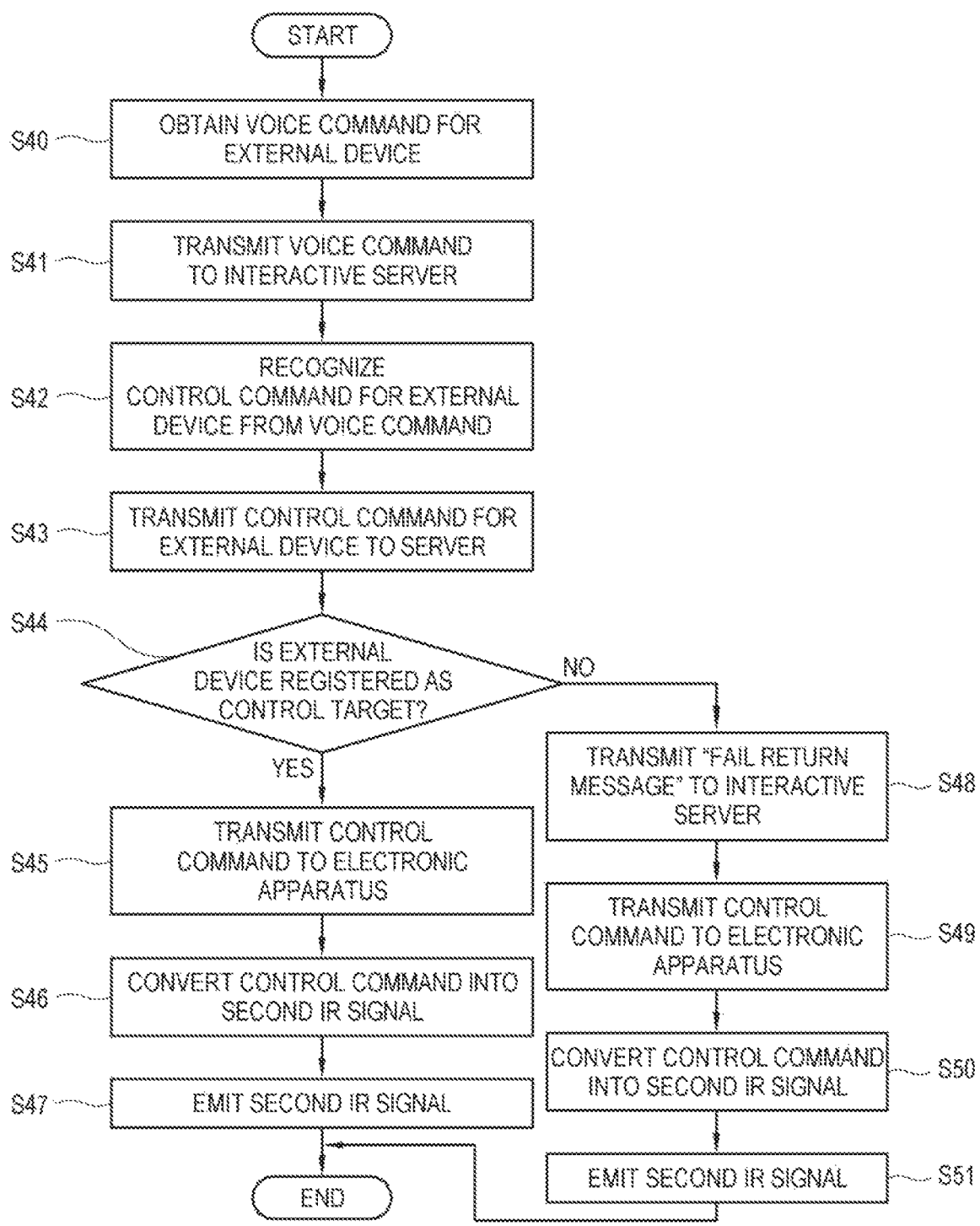
FIG. 13 is a flowchart of controlling an external device through a server, an interactive server and the electronic apparatus of the electronic apparatus control system of FIG. 4, according to an embodiment.

Referring to FIG. 13, a method of controlling the external device 400 through the server 200, the interactive server 500, and the electronic apparatus 100 of FIG. 4 will be described, according to an embodiment.

At operation S40, the electronic apparatus 100 obtains a voice command, for example, "set the temperature level of the air conditioner higher through the TV" for the external device 400.

At operation S41, the electronic apparatus 100 transmits the voice command of the user, for example, "set the temperature level of the air conditioner higher through the TV" for the external device 400, to the interactive server 500.

At operation S42, the interactive server 500 recognizes the control command for controlling the external device from the voice command of the user. For example, the interactive server 500 may extract the control command from the voice command.

At operation S43, the interactive server 500 transmits the recognized control command to the server 200.

At operation S44, the server 200 determines whether the external device 400 targeted for the control command has been registered as the control target.

When it is determined that the external device 400 has been registered as the control target (S44, YES), the server 200 transmits the control command to the electronic apparatus 100 at operation S45. The server 200 may transmit the second IR signal code instead of the control command as necessary.

At operation S46, the first processor 140 of the electronic apparatus 100 converts the control command obtained from the server into the second IR signal code corresponding to the command information for the external device 400.

At operation S47, the first IR communicator circuit 120 of the electronic apparatus 100 emits the second IR signal corresponding to the second IR signal code.

When it is determined that the external device 400 has not been registered as the control target yet (S44, NO), the server 200 transmits the "fail return message", which states that the external device has not been registered yet, to the interactive server 500 in operation S48.

At operation S49, when the interactive server 500 obtains the "fail return message" from the server 200, the recognized control command for the external device is transmitted to the electronic apparatus 100.

At operation S50, the first processor 140 of the electronic apparatus 100 converts the control command obtained from the interactive server 500 to the second IR signal code corresponding to the command information for the external device 400.

At operation S51, the first IR communicator circuit 120 of the electronic apparatus 100 emits the second IR signal corresponding to the second IR signal code.

Figure 14:
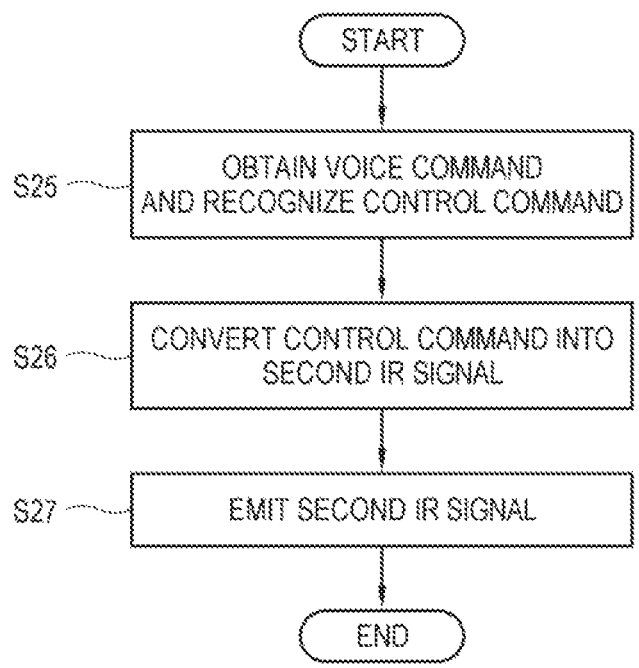
FIG. 14 is a flowchart of controlling an external device through the electronic apparatus of the electronic apparatus control system of FIG. 5, according to an embodiment.

Referring to FIG. 14, a method of controlling an external device through the electronic apparatus of FIG. 5 will be described, according to an embodiment.

At operation S25, the electronic apparatus 100 obtains a voice command and then recognizes a control command. For example, the electronic apparatus 100 obtains a voice command such as "set the temperature level of the air conditioner higher through the TV" for the external device 400, and then extracts the control command for the external device from the voice command of the user.

At operation S26, the first processor 140 of the electronic apparatus 100 converts the recognized control command into the second IR signal code corresponding to the command information for the external device 400.

At operation S27, the first IR communicator circuit 120 of the electronic apparatus emits the second IR signal corresponding to the second IR signal code.

As described above, according to the disclosure, a legacy electronic apparatus having no network communication functions, or an electronic apparatus (or an external device) which has been set to turn off network connection is registered as a virtual IoT device through a surrounding/nearby electronic apparatus, IoT server, interactive server, etc. and then subjected to IoT control, i.e. voice control or remote control.

Although the exemplary embodiments of the disclosure have been illustrated and described, the disclosure is not limited to the foregoing specific embodiments, various changes may be made by those skilled in the art to which the disclosure pertains without departing from the gist of the disclosure defined in the appended claims, and such alternative embodiments are construed without being separated from the technical concept and scope of the disclosure.

What is claimed is:

1. An electronic apparatus comprising:
an operation performer;
network communicator circuitry configured to perform network communication with a server;
infrared communicator circuitry; and
a processor configured to:
control the operation performer to perform a predetermined operation,
obtain information of an external device from a first infrared signal of the external device, the first infrared signal being obtained through the infrared communicator circuitry,
control the network communicator circuitry to transmit the obtained information of the external device to the server to register the external device as a control target,
obtain a control command for controlling the external device from the server, and
control the infrared communicator circuitry to transmit a second infrared signal, which contains command information based on the obtained control command, to the external device to make the external device perform an operation corresponding to the obtained control command.

2. The electronic apparatus according to claim 1, wherein the processor obtains the information of the external device based on a predetermined code included in the first infrared signal.

3. The electronic apparatus according to claim 2, wherein the operation performer comprises a display, and
the processor determines whether the external device is registered as the control target, controls the display to display a registration user interface (UI) based on identifying that the external device is not registered as the control target, and registers the external device as the control target in response to an input of a user to the registration UI.

4. The electronic apparatus according to claim 1, wherein the processor registers a function of the external device as an additional function of the electronic apparatus based on the external device being registered as the control target.

5. The electronic apparatus according to claim 1, wherein the processor registers a function of the external device to be controlled via the electronic apparatus based on the external device being registered as the control target.

6. The electronic apparatus according to claim 1, further comprising:
a user command obtainer configured to obtain a voice command of a user; and
a voice recognition engine configured to extract the control command from the voice command of the user.

7. The electronic apparatus according to claim 1, further comprising a user command obtainer configured to obtain a voice command of a user,
wherein the processor controls the infrared communicator circuitry to transmit the voice command of the user to the server, and
receives the control command extracted by the server from the voice command through the network communicator circuitry from the server.

8. The electronic apparatus according to claim 1, further comprising a user command obtainer configured to obtain a voice command of a user,
wherein the processor controls the network communicator circuitry to transmit the voice command of the user to an interactive server, and
receives the control command, which is recognized from the voice command by the interactive server, from the interactive server via the server.

9. An electronic apparatus comprising:
an operation performer;
infrared communicator circuitry; and
a processor configured to:
control the operation performer to perform a predetermined operation,
obtain information of an external device from a first infrared signal of the external device, the first infrared signal being obtained through the infrared communicator circuitry,
register the external device as a control target based on the obtained information of the external device, and
control the infrared communicator circuitry to transmit a second infrared signal which contains command information to make the external device perform an operation corresponding to a control command.

10. The electronic apparatus according to claim 9, further comprising network communicator circuitry configured to perform network communication with a control device,
wherein the control command is obtained from the control device via the network communicator circuitry.

11. A server comprising:
network communicator circuitry configured to perform network communication with an electronic apparatus; and
a processor configured to:
obtain information of an external device from the electronic apparatus through the network communicator circuitry,
register the external device as a control target based on the obtained information of the external device, and
control the network communicator circuitry to transmit a control command for controlling the external device to the electronic apparatus through the network communicator circuitry to make the electronic apparatus control the external device.

12. The server according to claim 11, further comprising a voice recognition engine configured to recognize a voice command of a user,
wherein the voice command of the user is obtained from the electronic apparatus through the network communicator circuitry.

13. The server according to claim 11, further comprising a voice recognition engine configured to recognize a voice command of a user,
wherein the network communicator circuitry performs network communication with a control device, and
the voice command of the user is obtained from the control device through the network communicator circuitry.

14. The server according to claim 11, wherein the processor registers a function of the external device as an additional function of the electronic apparatus based on the external device being registered as the control target.

15. The server according to claim 11, wherein the processor registers a function of the external device to be controlled via the electronic apparatus based on the external device being registered as the control target.

16. The server according to claim 11, wherein the network communicator circuitry performs network communication with an interactive server, and
the control command of the external device is obtained via the interactive server through the network communicator circuitry.

17. The server according to claim 16, wherein the processor identifies whether the external device is registered as the control target, based on the control command for the external device, controls the network communicator circuitry to transmit the control command to the electronic apparatus based on identifying that the external device is registered as the control target, and to transmit a non-registration message based on identifying that the external device is not registered as the control target.

18. A method of controlling an electronic apparatus, the method comprising:
obtaining a first infrared signal of an external device;
obtaining information of the external device from the first infrared signal;
transmitting the obtained information of the external device to a server to register the external device as a control target;
obtaining a control command for the external device from the server; and
transmitting a second infrared signal, which contains command information based on the control command, to the external device to make the external device perform an operation corresponding to the obtained control command.

19. The method according to claim 18, further comprising:
obtaining a voice command of a user;
transmitting the voice command of the user to an interactive server;
recognizing, by the interactive server, the control command for the external device from the voice command of the user;
transmitting, by the interactive server, the recognized control command for the external device to the server;
identifying, by the server, whether the external device is registered as the control target; and
transmitting, by the server, the control command to the electronic apparatus, based on identifying that the external device is registered as the control target.

20. The method according to claim 19, wherein the determining further comprises:
transmitting a non-registration message to the interactive server, based on identifying that the external device is not registered as the control target; and
transmitting, by the interactive server, the control command to the electronic apparatus.

* * * * *